(12) United States Patent
Wahrenberg

(10) Patent No.: US 11,423,608 B2
(45) Date of Patent: Aug. 23, 2022

(54) IRRADIANCE VOLUME BASED IMAGE RENDERING APPARATUS AND METHOD

(71) Applicant: CANON MEDICAL SYSTEMS CORPORATION, Otawara (JP)

(72) Inventor: Magnus Wahrenberg, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 17/066,917

(22) Filed: Oct. 9, 2020

(65) Prior Publication Data

US 2022/0114783 A1    Apr. 14, 2022

(51) Int. Cl.
    *G06T 15/50*    (2011.01)
    *G06T 15/08*    (2011.01)

(52) U.S. Cl.
    CPC ............ *G06T 15/506* (2013.01); *G06T 15/08* (2013.01); *G06T 2210/41* (2013.01)

(58) Field of Classification Search
    CPC .... G06T 15/506; G06T 15/08; G06T 2210/41
    See application file for complete search history.

(56) References Cited

U.S. PATENT DOCUMENTS

| | | | |
|---|---|---|---|
| 6,674,917 B1 | 1/2004 | Hisaki et al. | |
| 2005/0065425 A1* | 3/2005 | Matsumoto | G06T 15/06 600/407 |
| 2007/0257913 A1* | 11/2007 | Sloan | G06T 15/506 345/426 |
| 2010/0049488 A1 | 2/2010 | Benitez et al. | |
| 2014/0192054 A1 | 7/2014 | Yoo et al. | |
| 2014/0232719 A1* | 8/2014 | Wahrenberg | G06T 15/08 345/424 |
| 2016/0063758 A1 | 3/2016 | Schroecker | |
| 2016/0080719 A1 | 3/2016 | Tsukagoshi et al. | |
| 2016/0217563 A1 | 7/2016 | Wahrenberg | |
| 2016/0292913 A1 | 10/2016 | Wahrenberg | |
| 2018/0227568 A1 | 8/2018 | Vetter et al. | |
| 2018/0308278 A1 | 10/2018 | Qiu et al. | |
| 2018/0360425 A1 | 12/2018 | Wahrenberg | |
| 2019/0147645 A1 | 5/2019 | Mory et al. | |
| 2021/0049807 A1* | 2/2021 | Wright | G06T 15/506 |

OTHER PUBLICATIONS

European Search Report dated Mar. 17, 2022, issued in European Patent Application No. 21200108.5.
Peter Hedman et al., "Sequential Monte Carlo Instant Radiosity", IEEE Transactions on Visualization and Computer Graphics, vol. 23, No. 5, May 1, 2017, pp. 1442-1453.

* cited by examiner

*Primary Examiner* — William A Beutel
(74) *Attorney, Agent, or Firm* — Oblon, McClelland, Maier & Neustadt, L.L.P.

(57) ABSTRACT

An image processing apparatus includes processing circuitry configured to render an image from volumetric image data based on illumination from at least one simulated light source. The illumination is determined from a current portion of light intensity and at least one trailing portion of light intensity if a position or other property of the at least one simulated light source is changed.

20 Claims, 3 Drawing Sheets

IRRADIANCE VOLUME BASED IMAGE RENDERING APPARATUS AND METHOD

FIELD

Embodiments described herein relate generally to an image rendering apparatus and method.

BACKGROUND

Various image rendering techniques are known for producing images representing a scene and/or a feature of interest from volumetric image data, for example sets of voxels. Such image rendering techniques have application in many fields, including medical imaging applications in which images are rendered from volumetric image data obtained by using any suitable imaging modality, for example CT, MR, ultrasound, PET or SPECT imaging.

Many image rendering techniques require significant computational power, particularly when a user interacts with an image, for example by navigating an image or changing a viewpoint or lighting or other condition. Such interaction is common in medical imaging applications, for example where a user may wish to view an anatomical feature, pathology or other feature from different positions or under different conditions, for example for diagnosis or to assess a state of a patient or other subject.

Global Illumination and other advanced rendering techniques often require more computational power than is available in order to operate at their maximum level of performance. This is accentuated when re-rendering or re-computation is needed due to interaction by a user, for example movement of a virtual camera or light source or other change in condition. It is known to perform interactive rendering with lower image quality and/or reduced accuracy or other quality of lighting condition in cases where the virtual light source moves or the virtual camera moves with the light, for example by reducing the resolution of a irradiance volume. When the interaction stops, for example the virtual camera or light stops moving, the rendering can then be performed at highest quality for the now-stationary position. However this can result in an unnatural transition, following the completion of movement of the camera and/or light source in which the user can subsequently notice subtle changes across the whole image without any apparent movement of the camera or light. Such effects can have severe image quality implications on systems with lower or medium level computational power in particular, which may be the case for some workstations or other computing devices used in a clinical setting.

SUMMARY

In a first aspect there is provided an image processing apparatus comprising processing circuitry configured to:
  render an image from volumetric image data based on illumination from at least one simulated light source, wherein
  the illumination is determined from a current portion of light intensity and at least one trailing portion of light intensity if a position or other property of the at least one simulated light source is changed.

A sum of light intensities of the current portion of light intensity and the trailing portion of light intensity may be equal to that of a light intensity before the position of the at least one light source is changed.

The current portion of the light intensity and the trailing portion of the light intensity may be varied based on the change of position or other property of the at least one light source.

The change in position or other property of the at least one simulated light source may produce a plurality of illumination states each for a respective different time point. The processing circuitry may be configured to:
  for each of a succession of the time points, re-render the image using a combination of a current illumination state based on the current intensity for the current time point and at least one trailing illumination state based on the at least one trailing intensity for at least one previous time point.

The illumination states may comprise irradiance volumes or other data sets representing irradiance as a function of position.

The at least one trailing illumination state may comprise a transformed and/or faded version of what had been a current illumination state when the at least one previous time point had been a current time point.

A time-dependent function or other function may be applied to what had been a current illumination state when the at least one previous time point had been a current time point, in order to obtain the trailing illumination state for said at least one previous time point.

The function may comprise an exponential function.

The number of preceding time points used for the re-rendering is determined in dependence on a measure of performance and/or in dependence on available computational resources.

For the preceding illumination state(s) a variation of irradiance as a function of position may be altered to provide a blurring or other desired effect. The variation may be altered by applying a bidirectional reflectance distribution function or other function.

In response to the virtual light source becoming stationary, or said other change in at least one property of the light source ceasing, the number of trailing illumination states used for re-rendering may gradually be reduce to zero.

The illumination state for the current time point may be calculated with a lower resolution or other measure of quality than the illumination state for at least one of the preceding time points.

The illumination state for said current time point may be subsequently recalculated with a higher resolution or other measure of quality than the original lower resolution or other measure of quality.

The processing resource may be configured to identify movements of the simulated light source(s) that represent jumps, and in response to a jump being identified rendering the image using only the current portion of light intensity and/or without using the trailing portion of light intensity.

The processing circuitry may be configured to generate a plurality of frames, each corresponding to a respective one of the time points and representing the rendered image at that time point.

The processing circuitry may be configured to receive input and to produce a change in position or other property of the at least one simulated light source based on the user input.

Said other property may comprise at least one of orientation, beam direction or size, light colour.

The imaging data may comprise at least one of medical imaging data, CT, MR, ultrasound, PET or SPECT imaging data.

In a further aspect, which may be provided independently, there is provided an image processing method comprising:

rendering an image from volumetric image data based on illumination from at least one simulated light source, wherein the illumination is determined from a current portion of light intensity and at least one trailing portion of light intensity if a position or other property of the at least one simulated light source is changed.

Features according to one aspect may be provided as features according to any other aspect. For example, apparatus features may be provided as method features and vice versa.

BRIEF DESCRIPTION OF THE DRAWINGS

Embodiments are now described, by way of non-limiting example, and are illustrated in the following figures, in which.

DETAILED DESCRIPTION

Certain embodiments provide an image processing apparatus comprising processing circuitry configured to:

render an image from volumetric image data based on illumination from at least one simulated light source, wherein the illumination is determined from a current portion of light intensity and at least one trailing portion of light intensity if a position or other property of the at least one simulated light source is changed.

Certain embodiments provide an image processing method comprising:

rendering an image from volumetric image data based on illumination from at least one simulated light source, wherein the illumination is determined from a current portion of light intensity and at least one trailing portion of light intensity if a position or other property of the at least one simulated light source is changed.

Figure 1:
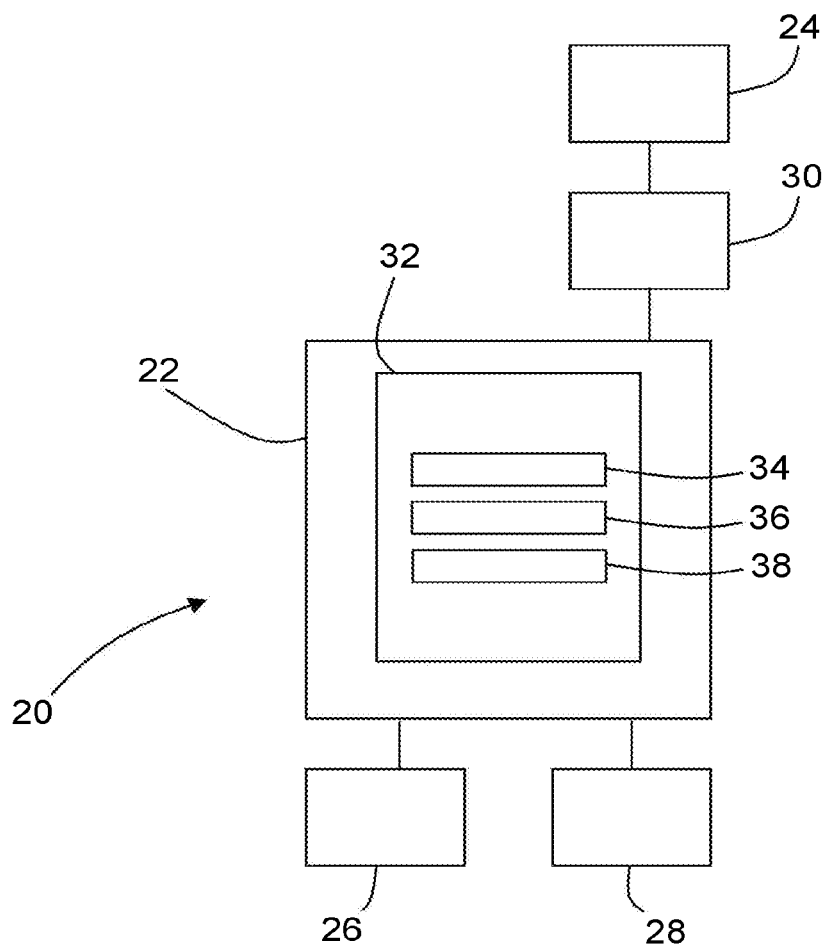
FIG. 1 is a schematic illustration of an apparatus in accordance with an embodiment.

A data processing apparatus 20 according to an embodiment is illustrated schematically in FIG. 1. In the present embodiment, the data processing apparatus 20 is configured to process medical imaging data. In other embodiments, the data processing apparatus 20 may be configured to process any other suitable image data.

The data processing apparatus 20 comprises a computing apparatus 22, which in this case is a personal computer (PC) or workstation. The computing apparatus 22 is connected to a display screen 26 or other display device, and an input device or devices 28, such as a computer keyboard and mouse.

The computing apparatus 22 is configured to obtain image data sets from a data store 30. The image data sets have been generated by processing data acquired by a scanner 24 and stored in the data store 30.

The scanner 24 is configured to generate medical imaging data, which may comprise two-, three- or four-dimensional data in any imaging modality. For example, the scanner 24 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner. The medical imaging data may comprise or be associated with additional conditioning data, which may for example comprise non-imaging data.

The computing apparatus 22 may receive medical image data and/or the further conditioning data from one or more further data stores (not shown) instead of or in addition to data store 30. For example, the computing apparatus 22 may receive medical image data from one or more remote data stores (not shown) which may form part of a Picture Archiving and Communication System (PACS) or other information system.

Computing apparatus 22 provides a processing resource for automatically or semi-automatically processing image data. Computing apparatus 22 comprises a processing apparatus 32. The processing apparatus 32 comprises lighting circuitry 34 for simulating lighting, for instance by providing at least one virtual light source and generating irradiance volumes or other illumination states using the at least one virtual light source.

The processing apparatus 32 also comprises rendering circuitry 36 configured to render images based on the image data and the simulated lighting; and interface circuitry 38 configured to obtain user or other inputs and/or to output rendered image frames or other rendered data from the rendering circuitry, for example to the display screen 26 for display.

In the present embodiment, the circuitries 34, 36, 38 are each implemented in computing apparatus 22 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 1 for clarity.

The data processing apparatus 20 of FIG. 1 is configured to perform methods as illustrated and/or described in the following.

It is a feature of certain embodiments that instead of only downsizing/reducing resolution of lighting calculations during relative movement of light source(s), the processing apparatus 32 is configured to amortize light movement over several frames, by dividing simulated light into at least two portions, a current portion and trailing portion. The trailing portion can be faded/reduced every time energy is added to the current portion, which keeps the intensity stable. Upon relative movement of the light source(s), the current portion of the light intensity can be added to the trailing portion of the light intensity before launching the lighting from the new position. Once the relative movement stops, the current portion can continue to be refined/increased until it reaches its full intensity. The image quality can be kept high and the image sharp by amortizing over several frames the updating of the current light based on the relative movement. At a rendering rate of 20 frames per second (fps) an amortization across 5 frames is 250 ms worth of maximum light lag. This can also create a type of type of motion blur effect.

Figure 2:
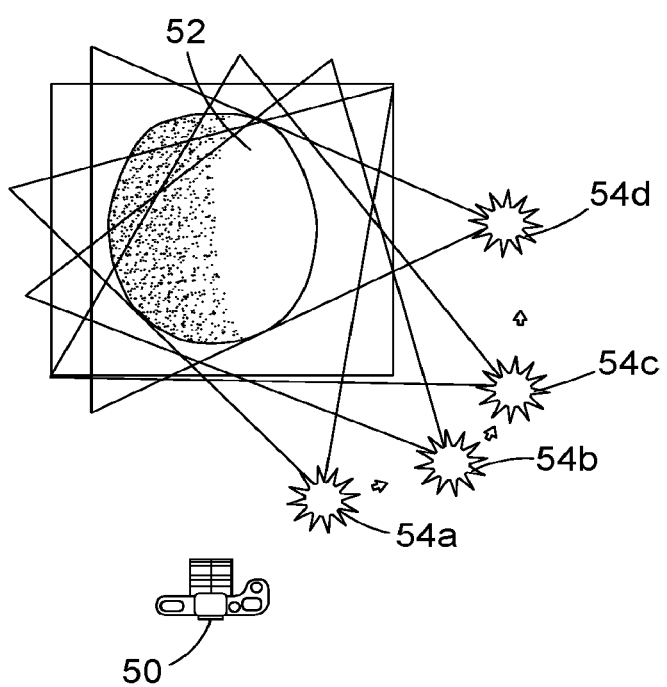
FIG. 2 is a schematic illustration showing relative positions of a virtual camera and a virtual light source during an interactive process in which the position of the virtual light source is moved relative to the scene viewed by the camera.
Figure 3:
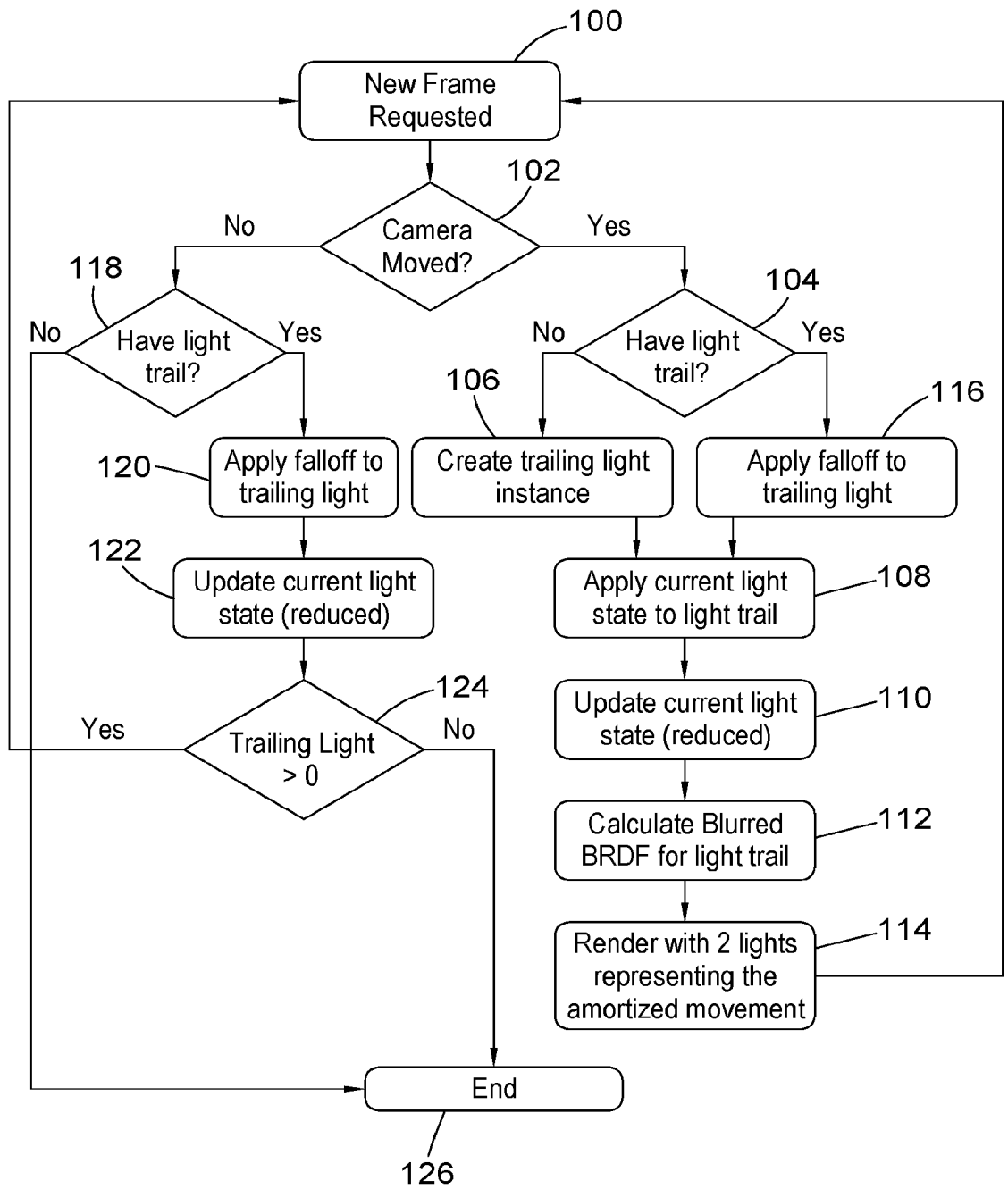
FIG. 3 is a flowchart illustrating in overview according to an embodiment.

The amortization processes according to certain embodiments are now described in more detail in relation to FIGS. 2 and 3.

FIG. 2 shows a virtual camera 50 that provides a viewpoint into a volume represented by an image dataset. The image dataset includes a representation of a feature of interest 52 that is present in the volume. In the case of medical applications, a feature of interest may for example comprise an anatomical feature or a pathology.

The volumetric image data set in the present embodiment comprises an array of voxels. The array of voxels is representative of a three-dimensional volume, which corresponds to some or all of the three-dimensional region of the patient. Each voxel has a position in the coordinate space of the volumetric imaging data set and an associated signal intensity. In alternative embodiments, the volumetric imaging data set may comprise multiple channels of signal intensity. For example, more than one signal intensity channel may be used if the volumetric imaging data set comprises dual-energy CT data, if the volumetric imaging data set comprises both pre-contrast and post-contrast data, or if the volumetric imaging data set comprises data obtained in a multi-volume fusion scenario. In further embodiments, the volumetric imaging data set may comprise non-voxel-based data.

FIG. 2 also shows a virtual light source 54 provided by the lighting circuitry 34. The virtual light source is shown in FIG. 2 at a succession of positions 54a, 54b, 54c, 54d each corresponding to a different time. Movement of the virtual light source from position 54a to position 54d, via positions 54b and 54c, is provided in this embodiment in response to user input determined based by the interface circuitry. The user input can be obtained via any suitable user input device, for example a touchscreen, a trackball, rotary switches, a mouse or a keyboard. Movement of the virtual light source illustrated in FIG. 2 results of the relative movement of light source 54 and the viewpoint provided by the virtual camera 50, given that in this example the virtual camera remains stationary relative to the volume.

In the embodiment of FIG. 2, the virtual light source is stationary at position 54a for a significant period before movement to 54d and there is no amortization during this period, or such amortization has little or no effect. The rendering process to produce rendered images with the virtual light source stationary at position 54a is first described in overview before further description of the lighting and rendering process during movement of the virtual light source from 54a to 54d is provided.

When the virtual light source 54 is at position 54a, the lighting circuitry 26 simulates light from the light source 54 using a lighting simulation process. The lighting simulation process comprises casting rays from the light source 54 through the volume.

Each simulated ray from the virtual light source distributes virtual light energy into the volume along the path of the ray. For each ray the lighting circuitry 36 calculates irradiance due to the ray at each of a succession of sample points along the ray. Any suitable spacing of the sample points may be used. The irradiance at each sample point is a product of the virtual light energy of the ray when it reaches the sample point and an absorption function at the sample point.

In the present embodiment, the absorption function is assigned to each sample point in dependence on the intensities of voxels neighboring that sample point. For example, an intensity may be determined for a sample point by interpolating intensities from neighboring voxels, and an absorption function may be assigned in dependence on the determined intensity. High voxel intensity may be associated with high absorption. In another embodiment, an absorption function may be assigned to each voxel in dependence on the voxel's intensity, and an absorption function for a sample point may be determined by interpolating absorption functions from neighboring voxels.

In some embodiments, the absorption function may be a function having color-dependent absorption properties, and may be described as a spectral absorption. The absorption function may for example be defined such that blue and green light are absorbed more strongly than red light, to represent the absorption of tissue. The irradiance calculated at each sample point is then a spectral irradiance, which may be described as a combination of red, green and blue components. In other embodiments, the irradiance may not be a spectral irradiance.

In the present embodiment, the calculated irradiance is not a directional irradiance. In other embodiments, an associated irradiance direction may be determined at each sample point for which irradiance is calculated. The irradiance direction may be the direction of incidence of light received at each sample point. Any suitable irradiance model may be used.

For each of the plurality of sample points on the ray for which irradiance is calculated, the lighting circuitry 36 may distribute irradiance to a plurality of neighboring voxels using any appropriate method. For example, in some embodiments, the irradiance may be distributed to the eight nearest neighbor voxels. In other embodiments, the irradiance at each sample point may be distributed to any appropriate number of voxels.

As each ray passes through the volume, some of the virtual light energy is absorbed at each sample point and the ray becomes weaker and redder in the present embodiment.

Once a sufficient portion of the virtual light energy in the ray has been absorbed, no further calculations may be performed on the ray in respect of positions further along the ray. In the present embodiment, if 99% of the virtual light energy in the ray has been absorbed, no further calculations are performed on that ray in respect of positions further along the ray. In other embodiments, the portion may be different, for example 90% or 95%.

The lighting simulation process may simulate scattering in some embodiments as well as direct illumination. At some sample points on a ray, scattering may occur as well as, or instead of, absorption. In the present embodiment, only single scattering is taken into account. In some embodiments, multiple scattering may be taken into account. In some embodiments, reflection may also be taken into account.

In the present embodiment, the result of the lighting simulation process performed by the lighting circuitry 36 for the virtual light source 54 at position 54a is an irradiance volume that comprises at least one irradiance value for each voxel position in the volumetric imaging data set. In the irradiance volume, each voxel has an associated irradiance which may be a combination of irradiance contributions from a plurality of rays that have deposited virtual light energy at sample points near the voxel.

In the present embodiment, a global illumination lighting model is used to calculate the irradiance volume. In other embodiments, any suitable lighting model may be used.

The irradiance volume (e.g. an irradiance value for each voxel in the volume) can also be referred to as an illumination state, for example a current illumination state for the time point at which the virtual light source is at position 54a.

In other embodiments, the irradiance volume may be defined for a grid of reference points which may or may not be coincident with voxels. In some embodiments, the irradiance volume may be defined for a downsampled grid of voxels. In further embodiments, the irradiance volume may be defined for a set of points that do not form a grid, for example a point cloud, a tree structure, or a tree structured point cloud.

Once the illumination state (e.g. the irradiance volume) has been calculated the rendering circuitry performs a rendering process based on the image data and the calculated illumination state for the virtual light source 54 at position 54*a*. The rendering process is performed for the viewpoint provided by the virtual camera 50 and comprising a viewing position and orientation.

The virtual camera may be positioned in accordance with an input from a user (for example, a clinician or radiologist). Alternatively, the rendering circuitry 38 may position the virtual camera 50 automatically.

The rendering circuitry 36 then renders an image based on the irradiance volume. In the rendering, the rendering circuitry 36 uses both the irradiance volume and the volumetric imaging data set.

The image is rendered as if viewed from the virtual camera 50. The rendering circuitry 36 casts rays from the camera into the volume represented by the volumetric imaging data set. Each ray may correspond to a pixel of a two-dimensional image data set that is to be obtained by the rendering. Each ray from the camera steps through the volume represented by the volumetric imaging data set in increments of the voxel spacing. In other embodiments, a different spacing may be used.

For a given ray that is cast from the camera, the rendering circuitry 36 determines from the calculated illumination state (e.g. the irradiance volume) a value of irradiance at each of a series of incremental points along the ray. If an incremental point is representative of empty space the ray skips on to the next incremental point.

The lighting circuitry 36 can determine irradiance at each incremental point by interpolating irradiance from neighboring voxels of the irradiance volume. In the present embodiment eight nearest-neighbor voxels are considered in the interpolation for each point. In other embodiments, a different number of voxels may be considered. The rendering circuitry 36 integrates the irradiances at each incremental point along a ray from the camera to obtain a pixel color value for the ray. The rendering circuitry 36 thereby determines a color value for each pixel in the two-dimensional image data set.

Once rendered image data has been calculated by the rendering circuitry 36, the interface circuitry 38 may output the rendered image data to the display 26 which then displays the rendered image. Alternatively the interface circuitry may transmit the rendered image data to a remote device, for example over a network, and/or may send the rendered image data to data store 30 or other storage device for storage.

Description is provided above of a lighting and rendering process performed for the virtual light source 54 stationary at position 54*a* and with no relative movement the virtual light source 54*a* and the volume viewed by the camera. It is a feature of embodiments that the lighting and rendering processes are modified during periods when there is relative movement of the virtual light source 54. A lighting and rendering process when there is relative movement of the virtual light source is now described with reference to the flow chart of FIG. 3.

At a first stage of the process 100, the processing apparatus 32 determines whether a new frame is required or requested. In the present embodiment, this determination is based on there being a desired or pre-determined frame refresh rate, with frames being regenerated and or re-displayed periodically, for example at a rate of 25 frames per second or any other suitable frame rate.

At the next stage 102, it is determined whether there has been a change in relative positon of the virtual light source 54 and the volume being viewed by the camera.

In the present example the virtual light source 54 has just moved from position 54*a* to position 54*b*, so there has been relative movement and the process moves to stage 104 where it is determined whether a light trail is currently in existence for the lighting and/or rendering process.

The movement has only just begun and no light trail is currently in existence so one is created at stage 106. The creation of a light trail in this embodiment comprises creating and/or storing data representing an illumination state, in this embodiment an irradiance volume, for the virtual light at a previous position corresponding to an earlier time point.

In this example, the light trail data is populated at stage 108 with the irradiance volume data for what had, until the movement, had been the current irradiance volume (e.g. the irradiance volume that had been generated with the light at the previous position 54*a*).

At stage 110 a new current illumination state is generated, in this embodiment an irradiance volume, for the virtual light source at what is now its new current position 54*b*. The irradiance volume is calculated using processes described above based on casting rays from the virtual light source and calculating irradiance for each ray at a series of sample points along the ray based upon intensity of the light source and an absorption function and/or scattering or other functions to build up irradiance volumes.

It is a feature of the embodiment of FIG. 3 that, during relative movement, the current light state (e.g. irradiance volume) is calculated with lower resolution and/or accuracy and/or other quality parameter than when the camera and light source are stationary to reduce the computational burden.

Thus, in this example the irradiance volume calculated for the virtual light source at position 54*b* (the current light state) is calculated with a step size between sample points that is greater than the step size between sample points that was used to calculate irradiance volume when the virtual light source was stationary for a significant period at position 54*a* (that irradiance volume from position 54*a* at this point of the process now being used as the trailing light portion). Although a greater step size may be used, reducing computational burden, interpolation or other processes can be used to ensure that the resolution of the irradiance volume data set for the current light portion (e.g. irradiance volume for light at position 54*b*) is the same (e.g. an irradiance value for each voxel) as the resolution of the irradiance volume for the trailing light portion (e.g. at this point in the process, irradiance volume for light at position 54*a*).

It is a feature of the embodiment that total intensity of the contribution from the current light and trailing light can be maintained constant. For example, in one variant of the embodiment the intensity of the virtual light source used in calculation of the current irradiance volume (light at position 54*b*) is reduced by 50% from its usual intensity when stationary, and the values of irradiance in the irradiance volume for the current light state (which in this example were calculated when the light 54 was stationary at position 54*a*) are also reduced by 50%, thereby to maintain overall lighting intensity constant despite the movement and the contribution from two or more positions of the virtual light source.

In some variants, or alternative embodiments, any suitable time-dependent or other function can be used to determine the relative weight given to current and trailing portions, for example an exponential function may be applied for instance to intensities and/or irradiance values in some embodiments, such that the contribution provided by trailing light portion(s) falls off exponentially with time. In some embodiments, the function used or its parameters and/or the number of preceding time points for which trailing light states are used, can be vary in dependence on for example the computational resources that are available and/or in dependence on a measure of performance.

It can be provided that the at least one trailing illumination state comprises a transformed and/or faded version of what had been a current illumination state when the at least one previous time point had been a current time point.

At the next stage 112, which is an optional stage of some variants of the present embodiment, a function, for example a blurring function, is applied to the trailing light state (e.g. the irradiance volume for the previous position 54a of the virtual light source 54). The function may be such as to represent or take into account, for example, an uncertainty in directionality caused by the light trailing the interaction. The function may provide any suitable desired effect.

At the next stage 114, the rendering circuitry 38 then re-renders an image of the volume using rendering processes as described above in relation to stage 114, based on irradiance and the volumetric imaging data set. However, the irradiance values used in performing the rendering calculations are now obtained from a combination of the irradiance values for the irradiance volumes obtained for both trailing light and current light positions (e.g. 54a and 54b at this stage of the process).

Once rendered image data has been calculated by the rendering circuitry 36, the interface circuitry 38 then outputs the rendered image data to the display 26 which then displays the rendered image.

The process then returns to stage 100. When it is time for a new frame to be displayed, for example based on the current frame rate, the process passes to stage 102 and it is determined whether there has been further relative movement of the virtual light source 54. In this example of operation of the embodiment, there has been further relative movement as the virtual camera 54 has now moved to position 54c.

The process then passes to stage 104 and it is determined that, at present, a light trail is currently in existence (e.g. the irradiance volume arising from previous virtual light position 54b).

The process then passes to stage 116 and a fall-off function is applied to the existing trailing light state. Any suitable function may be used and may, for example, provide that the significance of trailing light contributions reduce with time. In the present example of operation of the embodiment an exponential function is applied and the magnitude of irradiance values in the irradiance volume obtained for virtual light position 54a is reduced further, for example by a scaling factor obtained by application of the exponential or other function.

The process then passes to stage 108 and, again, the light trail data is modified to include irradiance volume data for what had, until the latest movement, been the current irradiance volume (e.g. now the irradiance volume that had been generated with the light at the previous position 54b).

Thus the light trail data now includes contributions from irradiance data obtained for both previous virtual light positions 54a, 54b but with greater weighing being given to the irradiance data for the more recent virtual light position 54b.

It was mentioned above that the irradiance volume calculated for the virtual light source at position 54b was calculated with a step size between sample points that was greater than the step size between sample points that was used to calculate irradiance volume when the virtual light source was stationary for a significant period at position 54a, thereby to reduce computational burden. In some variants of the embodiment, or alternative embodiments, the time between the previous iteration of stage 110 and the return to stage 108 is used by the lighting circuitry 34 to refine the irradiance volume calculated for virtual light source 54b using a smaller step size, for example the same step size as used to calculate the irradiance volume for stationary position 54a. Alternatively the irradiance volume for position 54b with original, greater step size may continue to be used.

At the next stage 110, a new current illumination state is again generated, in this embodiment an irradiance volume, for the virtual light source at what is now its new current position 54c. The irradiance volume is calculated using processes described above based on casting rays from the virtual light source 54 and calculating irradiance for each ray at a series of sample points along the ray based upon intensity of the light source and an absorption function and/or scattering or other functions to build up irradiance volumes. Again, an increased step size is used in order to reduce computational burden.

The process then again passes through stages 112 and 114 to apply blurring or other processes to the light trail data and then to perform rendering based on both current light data (e.g. irradiance volume data for virtual light position 54c) and the trailing light data (e.g. irradiance volume data for virtual light positions 54a and 54b, with different weightings and maintaining overall effective light intensity constant) and the rendered image is displayed.

In the present example, the process then passes through stages 100, 102, 104, 116, 108, 110, 112, 114 again, but with the current light portion contribution now being the irradiance volume calculated for new virtual light position 54d, and the irradiance volumes obtained for previous virtual light positions 54a, 54b, 54c contributing to the trailing light portion, with weighting falling off with time such that there is greater contribution to the irradiance arising from virtual light position 54c than from virtual light positions 54b and 54a.

The virtual light 54 in the present example of operation of the embodiment of FIG. 3 then remains stationary. Thus, when the process next proceeds to stage 102 it is determined that there has been no further relative movement and the process proceeds to stage 118 where it is determined that there is light trail data (e.g. the irradiance volume contributions for virtual light positions 54a, 54b, 54c) and the process proceeds to stage 120.

At stage 120 the fall-off function, for example the exponential function mentioned above, is applied to the trailing light data, thereby reducing the trailing light contribution (e.g. the irradiance volume contributions for virtual light positions 54a, 54b, 54c) relative to the current light contribution (e.g. the irradiance volume contributions for virtual light position 54d). A cut-off is also applied at this stage such that if the trailing light contribution for a virtual light position (e.g. position 54a, 54b or 54c) falls below a threshold value it is set to zero.

At the next stage 122 the current light contribution (e.g. the irradiance volume data for virtual light position 54d) is updated. This can comprise recalculating or refining the irradiance volume data with a reduced step size, or otherwise increasing its accuracy (for example, in some embodiments taking into account additional effects such as scattering or reflection that might be omitted from the calculation whilst the light source is moving).

It is not indicated in FIG. 3, but at the next stage the rendering circuitry 38 then renders an image as described above, based on irradiance and the volumetric imaging data set. The irradiance values used in performing the rendering calculations are obtained from a combination of the irradiance values for the irradiance volumes obtained for the current light position (e.g. position 54d) and for any remaining irradiance contributions for trailing light positions (e.g. positions 54a, 54b, 54c) that have not yet fallen to zero due to application of the exponential function or other fall-off function.

At the next stage 124 it is determined whether all trailing light contributions have fallen to zero. If not, then the process returns to stage 118 and stages 118, 120, 122, 124 are repeated resulting in a series of rendered images being displayed with reducing contributions arising from previous positions of the virtual light and with lighting calculations for the current location becoming more refined and/or accurate.

When all trailing light contributions have fallen to zero the process passes from stage 124 to stage 126 and from there back to stage 100. Until there is further movement of the light source, or other change in lighting or rendering, then the same rendered image will remain displayed on the display.

Operation of the embodiment of FIG. 3 described above is described in relation to movement of a virtual light source relative to a volume it is illuminating, whilst a virtual camera position remains stationary. In some embodiments the virtual light source(s) is linked to the position of the virtual camera and the change in position of the camera is monitored, for example at stage 102. In other embodiments, trailing light states are used for re-rendering in response to there being some other change in property of the light as well as or instead of the position of the virtual light source, for example at least one of orientation of the light source, beam direction or size or shape of a light beam produced by the virtual light source, or light colour.

In some embodiments a plurality of virtual light sources are provided and trailing light states may be used in response to a change in position or other property of any one or more of the light sources.

In some embodiments the processing circuitry determines whether a change in position or other property represents a jump (for example a change greater than a threshold amount in less than a threshold time) and in response to a jump being identified rendering the image using only the current portion of light intensity and/or without using the trailing portion of light intensity. Thus, for example, normal rendering processes can be used when such a jump occurs.

Although particular light calculation and rendering processes, based on ray-casting, have been described in relation to particular embodiments, any suitable light calculation and rendering processes can be used in alternative embodiments.

Any suitable virtual light source can be used, for example a directional light source, or non-directional light source, a homoegenous light source and/or a combination of light sources.

Certain embodiments provide a global illumination rendering apparatus in which a continuous movement of the light, or movement of the camera and the light is amortized by combining a partial update of the new light configuration with a transformed and/or faded portion of the previous light state.

The trailing portion of the light and the up-to-date portion may be accumulated in separate states and combined when the up-to-date portion expires by an additional change in light configuration.

The amortization may run over several frames of the update

A falloff function may be used for the trailing light and the total remaining intensity may be used to determine if additional frames are required. Exponential falloff can be a suitable falloff function.

The amortization frame count may be calculated based on the current or historical interactive performance of the system as it is running.

Multiple moving light may contribute to the same trailing state, whilst keeping separate up-to-date lighting states.

A bidirectional reflectance distribution function (BRDF) may be provided or modified for the trailing light state to model the uncertainty in directionality caused by the light trailing the interaction.

The apparatus may identify interactions that should be considered jumps rather than continuous movement, in which the system falls back on regular image quality management metrics.

Illumination states have been described in the form of irradiance volumes in certain embodiments. Any other suitable illumination states may be used. References to irradiance volumes in relation to certain embodiments can be replaced with references to radiance volumes if desired.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image processing apparatus comprising processing circuitry configured to:
obtain a first irradiance volume for a first time point by performing a first light simulation process on volumetric image data, wherein the first simulation process simulates light from at least one simulated light source;
obtain a second, different irradiance volume for a second time point subsequent to the first time point by performing a second light simulation process on the volumetric image data, wherein the second light simulation process simulates light from the at least one simulated light source, and wherein a position or other property of the at least one simulated light source is changed between the first time point and the second time point; and render an image from the volumetric image data based on illumination from at least one simulated light source and representative of the second time point, wherein the illumination is determined from a current portion of light intensity from the second irradiance volume and at least one trailing portion of light intensity from the first irradiance volume.

2. The image processing apparatus according to the claim 1, wherein a sum of light intensities of the current portion of light intensity and the trailing portion of light intensity is equal to that of a light intensity at the first time point.

3. The image processing apparatus according to claim 2, wherein the current portion of the light intensity and the trailing portion of the light intensity are varied based on the change of position or other property of the at least one light source.

4. The image processing apparatus according to claim 1, wherein the processing circuitry is configured to:

for each of a further succession of time points, re-render the image using a combination of a current illumination state based on a current intensity for a current time point and at least one trailing illumination state based on at least one trailing intensity for at least one previous time point.

5. The image processing apparatus according to claim 4, wherein the at least one trailing illumination state comprises a transformed and/or faded version of what had been a current illumination state when the at least one previous time point had been a current time point.

6. The image processing apparatus according to claim 4, wherein a time-dependent function or other function is applied to what had been a current illumination state when the at least one previous time point had been a current time point, in order to obtain the trailing illumination state for said at least one previous time point.

7. The image processing apparatus according to claim 6, wherein the function comprises an exponential function.

8. The image processing apparatus according to claim 4, wherein a number of preceding time points used for the re-rendering is determined in dependence on a measure of performance and/or in dependence on available computational resources.

9. The image processing apparatus according to claim 4, wherein for a preceding illumination state(s) a variation of irradiance as a function of position is altered to provide a blurring or other desired effect.

10. The image processing apparatus according to claim 9, wherein the variation is altered by applying a bidirectional reflectance distribution function or other function.

11. The image processing apparatus according to claim 4, wherein in response to the simulated light source becoming stationary, or said other change in at least one property of the light source ceasing, a number of trailing illumination states used for re-rendering gradually reduces to zero.

12. The image processing apparatus according to claim 4, wherein the illumination state for the current time point is calculated with a lower resolution or other measure of quality than the illumination state for at least one of the preceding time points.

13. The image processing apparatus according to claim 12, wherein the illumination state for said current time point is subsequently recalculated with a higher resolution or other measure of quality than the original lower resolution or other measure of quality.

14. The image processing apparatus according to claim 4, wherein the processing circuitry is configured to generate a plurality of frames, each corresponding to a respective one of the time points and representing the rendered image at that time point.

15. The image processing apparatus according to claim 1, wherein the processing circuitry is configured to identify movements of the simulated light source(s) that represent jumps, and in response to a jump being identified rendering the image using only the current portion of light intensity and/or without using the trailing portion of light intensity.

16. The image processing apparatus according to claim 1, wherein the processing circuitry is configured to receive user input and to produce a change in position or other property of the at least one simulated light source based on the user input.

17. The image processing apparatus according to claim 1, wherein said other property comprises at least one of orientation, beam direction or size, or light colour.

18. The image processing apparatus according to claim 1, wherein the imaging data comprises at least one of medical imaging data, CT, MR, ultrasound, PET or SPECT imaging data.

19. The image processing apparatus according to the claim 1, wherein the position of the at least one simulated light source is changed between the first time point and the second time point.

20. An image processing method comprising:

obtaining a first irradiance volume for a first time point by performing a first light simulation process on volumetric image data, wherein the first simulation process simulates light from at least one simulated light source;

obtaining a second, different irradiance volume for a second time point subsequent to the first time point by performing a second light simulation process on the volumetric image data, wherein the second light simulation process simulates light from the at least one simulated light source, and wherein a position or other property of the at least one simulated light source is changed between the first time point and the second time point; and rendering an image from the volumetric image data based on illumination from at least one simulated light source and representative of the second time point, wherein the illumination is determined from a current portion of light intensity from the second irradiance volume and at least one trailing portion of light intensity from the first irradiance volume.

* * * * *